United States Patent
Wilenski et al.

(10) Patent No.: US 7,963,125 B2
(45) Date of Patent: Jun. 21, 2011

(54) GLASS FIBERS HAVING IMPROVED STRENGTH

(75) Inventors: Mark S. Wilenski, Seattle, WA (US); Adam J. Lang, Huntington Beach, CA (US); Alan M. Markus, Lake Forest, CA (US); Larry A. Godby, North Hills, CA (US)

(73) Assignee: The Boeing Company, Chicago, IL (US)

( * ) Notice: Subject to any disclaimer, the term of this patent is extended or adjusted under 35 U.S.C. 154(b) by 341 days.

(21) Appl. No.: 12/042,549

(22) Filed: Mar. 5, 2008

(65) Prior Publication Data

US 2009/0226692 A1  Sep. 10, 2009

(51) Int. Cl.
*C03C 17/02* (2006.01)
*B32B 9/00* (2006.01)

(52) U.S. Cl. ............. 65/444; 65/385; 65/442; 428/387; 428/390

(58) Field of Classification Search .......... 385/123–128; 428/379, 384, 387, 390; 65/385, 442–444
See application file for complete search history.

(56) References Cited

U.S. PATENT DOCUMENTS

| | | | |
|---|---|---|---|
| 3,073,005 A | 1/1963 | Tiede | |
| 3,425,454 A | 2/1969 | Eakins et al. | |
| 3,822,120 A | 7/1974 | Koizumi et al. | |
| 4,504,113 A * | 3/1985 | Baak | 385/128 |
| 4,698,083 A | 10/1987 | Shioura et al. | |
| 4,770,935 A | 9/1988 | Yamamura et al. | |
| 4,875,917 A | 10/1989 | Lentz | |
| 4,938,823 A | 7/1990 | Balazek et al. | |
| 5,024,859 A | 6/1991 | Millard et al. | |
| 5,039,566 A | 8/1991 | Skubic et al. | |
| 5,585,155 A | 12/1996 | Heikkila et al. | |
| 5,665,450 A | 9/1997 | Day et al. | |
| 6,818,306 B2 | 11/2004 | Miller et al. | |

(Continued)

FOREIGN PATENT DOCUMENTS

| | | |
|---|---|---|
| GB | 1406233 | 9/1972 |
| JP | 07-018186 | * 1/1995 |
| JP | 08-188926 | * 7/1996 |

OTHER PUBLICATIONS

Dennis N Coon, Jerry R Weidner, "Elastic moduli of Y—Al—Si—O—N glasses", Journal of Non-Crystalline Solids, vol. 116, Issues 2-3, Feb. 2, 1990, pp. 201-205.*

*Primary Examiner* — Charlie Peng
(74) *Attorney, Agent, or Firm* — McNees Wallace & Nurick LLC

(57) ABSTRACT

A glass fiber and a method of manufacturing a glass fiber for reinforcing a transparent composite matrix are disclosed. The glass fiber includes a first glass material having a first set of mechanical properties including a first modulus and a first coefficient of thermal expansion (CTE) and a second glass material having a second set of mechanical properties including a second modulus and a second CTE. The second glass material forms a substantially uniform coating on the first glass material. The second CTE is less than the first CTE. The glass fiber is formed by reducing the cross-section of a glass fiber preform of the first glass material coated with the second glass material by hot working. Because of the selected difference in the CTE's, the first glass material imparts a compressive force upon the second glass material, which improves the strength of the glass fiber.

9 Claims, 1 Drawing Sheet

U.S. PATENT DOCUMENTS

| | | |
|---|---|---|
| 6,889,938 B1 | 5/2005 | Nordman |
| 7,028,950 B2 | 4/2006 | Salmon et al. |
| 2004/0062934 A1 | 4/2004 | Miller et al. |
| 2005/0042457 A1 | 2/2005 | Miller et al. |
| 2006/0024017 A1* | 2/2006 | Page et al. .................... 385/146 |
| 2007/0034743 A1 | 2/2007 | Albers et al. |
| 2008/0078876 A1* | 4/2008 | Baggette et al. ........... 244/129.3 |
| 2008/0205840 A1* | 8/2008 | Wakabayashi et al. ....... 385/128 |

* cited by examiner

GLASS FIBERS HAVING IMPROVED STRENGTH

FIELD

The present disclosure is directed to transparent reinforcing materials and reinforced composite materials, more particularly to transparent glass fibers used in composite materials and to a process for producing such fibers.

BACKGROUND

Transparent composite materials are known for use in vehicle and other applications requiring light transmission or visual transparency. Such transparent composite materials include windows or other transparent materials useful for light transmission there through, particularly in rugged environments and in locations requiring ballistic resistance. Such reinforcement further provides the window or transparent device with improved strength.

Transparent composite materials typically include a reinforcing fiber in a polymeric matrix. In order to render the composite material transparent, both the matrix material and the reinforcing fiber are fabricated from a transparent material. The materials are typically selected to include the same optical properties, thus minimizing distortion.

The geometry of reinforcing fibers also affects the distortion imparted to the light passing through the transparent device. For example, round fibers (i.e., fibers having a circular cross-section) provide prismatic or other optical light refractive effects that provide overall distortion of the light passing through the transparent device.

These transparent composite materials are also required to withstand high impacts and structural loads, and thus are required to have high strength properties. The strength of these composite materials is dependent upon both the strength of the matrix material and the reinforcing fibers.

The strength of the reinforcing fibers is determined by the fiber material, geometry and characteristics imparted to the fibers during manufacture, such as surface cracks, imperfections, and other inconsistencies.

What is needed is a fiber reinforcing material having improved surface characteristics over the prior art.

SUMMARY

A first aspect of the disclosure includes a glass fiber for reinforcing a transparent composite matrix. The fiber includes a first glass material having a first set of optical characteristics including, but not limited to, a first refractive index (RI), a first modulus of elasticity (modulus), and a first coefficient of thermal expansion (CTE), and a second glass material having a second set of optical properties including, but not limited to, a second RI, a second modulus, and second CTE. The second glass material forms a substantially uniform coating on the first glass material. The second CTE is less than the first CTE.

Another aspect of the disclosure includes a method for fabricating a glass fiber for reinforcing a transparent composite matrix including providing a first glass fiber preform having a first RI, a first modulus, and a first CTE, coating a second glass material having a second RI, second modulus, and a second CTE, substantially around a cross-section of the first glass material to form an initial coated glass fiber preform having an initial cross-section, and hot working the initial coated glass fiber preform to reduce the initial cross-section to a final cross-section of the glass fiber. The second CTE is selected to be less than the first CTE.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION OF THE DISCLOSURE

Figure 1:
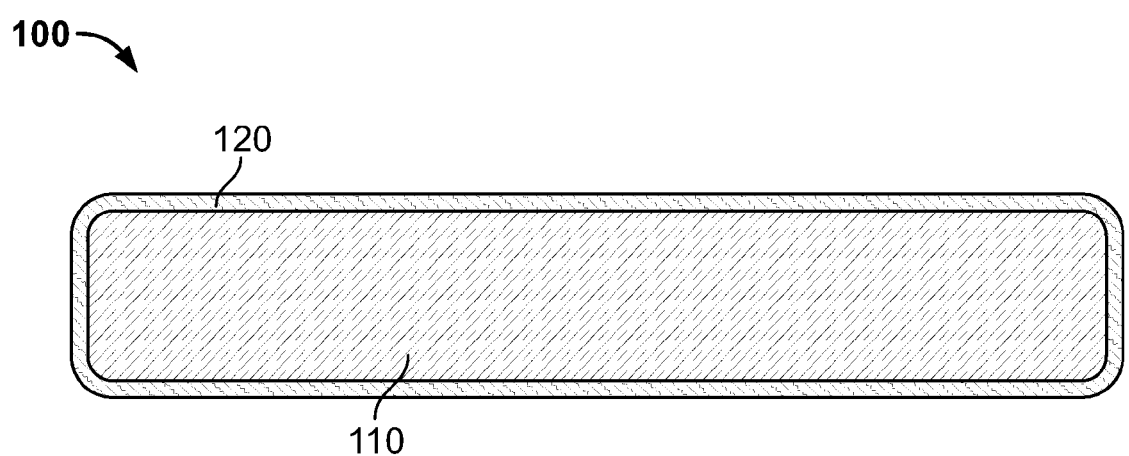
FIG. 1 shows a schematic cross-section view of a glass fiber according to an exemplary embodiment of the disclosure.

"Transparent", "transparency" and grammatical variations thereof include an ability of a material to permit passage of at least a portion of light directed at the material, the term "light" including any wavelength range of interest, and more particularly to the visible, near visible and near infra-red light ranges from about 380 nm to about 1000 nm.

Referring to FIG. 1, a cross-section view of an exemplary glass fiber 100 according to the disclosure is shown. As can be seen in FIG. 1, glass fiber 100 includes a first glass material 110 and a second glass material 120. The second glass material 120 forms a substantially uniform coating around the first glass material 110. The glass fiber 100 has a generally rectangular cross-section geometry having a total thickness T, a first material thickness $T_1$, a second glass material coating thickness $T_2$, and a width W. The first glass material 110 and the second glass material 120 may both be transparent glass. In one embodiment, the first glass material 110 and the second glass material 120 may both be transparent optical glass.

In alternative embodiments, the glass fiber 100 may have a different cross-section geometry, for example, but not limited to generally square, generally oval, generally round and other similar geometries.

In one embodiment, the glass fiber 100 has a total thickness T of between about 1 um to about 500 um with an aspect ratio of width W to total thickness T of between about 5 and about 500. In another embodiment, the glass fiber 100 has a total thickness T of between about 5 um and about 50 um with an aspect ratio of width W to total thickness T of between about 10 and about 50.

In one embodiment, the second glass material coating thickness $T_2$ is between about 0.1% and about 100% the first glass material thickness $T_1$. In another embodiment, the second glass material coating thickness $T_2$ may be between about 50 nm and about 5 um. In yet another embodiment, the second glass material coating thickness $T_2$ may be between about 50 nm and about 1 um.

In another embodiment, the glass fiber 100 has a width W of between about 5 um and 5000 um and an aspect ratio of width W to total thickness T of between about 5 and about 500. In yet another embodiment, the glass fiber 100 has a width of between about 100 um to about 500 um and an aspect ratio of width W to total thickness T of between about 10 and about 30.

The first glass material 110 is selected to have a first set of properties, including but not limited to a first RI, a first Abbe number, a first transmission, a first modulus and a first CTE. The second glass material 120 is selected to have a second set of properties, including, but not limited to a second RI, a second Abbe number, a second transmission, a second modulus and a second CTE. The second CTE is selected to be less than the first CTE.

The second glass material 120 must be chemically compatible with the first glass material 110. Furthermore, the second glass material 120 must not contain elements that will negatively affect the desirable properties of the first glass material 110 during the method of forming the glass fiber 100 or in the glass fiber 100.

Additionally, the second glass material 120 must be thermally compatible with the first glass material 110 to facilitate forming the fiber 100. For example, the second glass material 120 must have approximately the same viscosity versus temperature profile at hot working temperatures as the first glass material.

In one embodiment, the second CTE is between about 0% to about 100% less than the first CTE. In yet another embodiment, the second CTE is between about 70% to about 90% less than the first CTE.

In one embodiment, the first RI is approximately equal to the RI of a polymeric material in which the glass fiber 100 is used to form a composite structure. The composite structure may be a window. In another embodiment, the first RI is substantially different form the second RI. In yet another embodiment, the first RI is approximately equal to the second RI.

In another embodiment, the second modulus is about equal to or less than the first modulus. In another embodiment, the second modulus is between about equal and about 60% less than the first modulus.

In one embodiment, the second glass material has approximately the same optical performance as the first glass material. The second glass material may also have approximately the same viscosity versus temperature profile at hot working temperatures as the first glass material to facilitate forming the glass fiber.

The glass fiber 100 may be formed by the following exemplary embodiment. First, a first glass material preform of the first glass material is formed having a desired cross-section geometry and aspect ratio. The cross-section of first material glass preform may be generally rectangular, generally square, generally circular, or other similar shape. The first glass material preform may be formed by drawing, spinning, machining or other similar process.

The first glass material preform is then coated with a substantially uniform coating of the second glass material. The first glass material may be chosen for a desired optical performance. The second glass material is chosen for it's lower CTE compared to the CTE of the first glass material.

The second glass material may be coated onto the first glass material preform by slumping, chemical vapor deposition, plasma vapor deposition, sol-gel processing, slurry coating, or other similar process. Alternatively, a coating of the second glass material may be formed on the first glass material preform by modifying the surface composition of the first material preform by methods such as, but not limited to, reactive chemical diffusion. By forming the second glass material by modifying the surface of the first glass material preform composition, the second material has a compositional gradient varying from that of the surface of the coated first glass material preform to the first glass material preform composition. The material properties of the modified surface would also have a gradient from the properties of the second glass material at the surface to the properties of the first glass material preform material at some predetermined distance from the surface. The composition and property gradient may be abrupt or gradual in nature.

In one embodiment, the first glass material preform has a generally rectangular cross-section having a thickness of between about 0.5 mm and about 12.7 cm and an aspect ratio of width to thickness of between about 5 and about 500.

In another embodiment, the second glass material coating thickness on the first glass material preform is between about 1 um and 25.4 mm.

In another embodiment, the second glass material coating thickness is between about 0.1% and about 100% the thickness of the first glass material preform.

The coated glass fiber preform is then drawn under heat and pressure by methods well known in the art to form a glass fiber having a rectangular cross-section geometry having a total thickness, a first material thickness, a second glass material coating thickness, and a width as discussed above. The glass fiber may be formed in a continuous, semi-continuous, or step process. In one embodiment, the coated glass fiber is provided as a stock material that is later drawn to form a glass fiber.

The glass fiber may be used with an epoxy resin or other polymer to form a composite structure, such as a window, by methods appreciated by one of ordinary skill in the art.

In one embodiment, the formed glass fiber has a second glass material coating thickness between about 0.1% and about 100% the first glass material thickness. In another embodiment, the second glass material coating thickness may be between about 50 nm and about 5 um. In yet another embodiment, the second glass material coating thickness may be between about 50 nm and about 1 um.

In another embodiment, the formed glass fiber has a total thickness of between about 1 um to about 500 um with an aspect ratio of width to total thickness of between about 5 and about 500. In another embodiment, the formed glass fiber has a total thickness of between about 5 um and about 50 um with an aspect ratio of width to total thickness of between about 10 and about 50.

In another embodiment, the formed glass fiber has a width of between about 5 um and 5000 um and an aspect ratio of width to total thickness of between about 5 and about 500. In yet another embodiment, the glass fiber 100 has a width of between about 100 um to about 500 um and an aspect ratio of width to total thickness of between about 10 and about 30.

To form the glass fiber, the first glass material is selected to have a first set of optical properties, including but not limited to a first RI, a first Abbe number, a first transmission, a first modulus and a first CTE, and the second glass material is selected to have a second set of optical properties, including, but not limited to a second RI, a second Abbe number, a second transmission, a second modulus and a second CTE. The second CTE is selected to be less than the first CTE.

The second glass material 120 must be chemically compatible with the first glass material 110. Furthermore, the second glass material 120 must not contain elements that will negatively affect the desirable properties of the first glass material 110 during the method of forming the glass fiber 100 or in the glass fiber 100.

Additionally, the second glass material 120 must be thermally compatible with the first glass material 110 to facilitate forming the fiber 100. For example, the second glass material 120 must have approximately the same viscosity versus temperature profile at hot working temperatures as the first glass material.

In one embodiment, the formed glass fiber includes a second glass material having a second CTE between about 0% to about 100% less than the first CTE. In yet another embodiment, the second CTE is between about 70% to about 90% of the first CTE.

In another embodiment, the formed glass fiber includes a first glass material having a first modulus and a second glass material having a second modulus, the second modulus is about equal to or less than the first modulus. In another embodiment, the second modulus is between about equal and about 60% less than the first modulus.

In one embodiment, the formed glass fiber has a first RI approximately equal to the RI of a polymeric material in which the glass fiber 100 is used to form a composite structure. The composite structure may be a window. In another embodiment, the first RI is substantially different from the second RI. In yet another embodiment, the first RI is approximately equal to the second RI.

In one embodiment, the formed glass fiber has a first glass material having approximately the same optical performance as the second glass material. In another embodiment, the formed glass fiber has a first glass material having approximately the same viscosity versus temperature profile at hot working temperatures as the second glass material.

In one example, a glass fiber is formed by selecting an optical glass N-SSK8 produced by SCHOTT North America, Inc., of Elmsford, N.Y., as a first glass material. This optical glass has a set of optical properties, including but not limited to an RI, a Abbe number, a transmission, a modulus and a CTE of 7.21 $e^{-6}$/C. A second glass material, having a lower CTE is then used to coat the first glass material and form a glass fiber. The second glass material is selected to be chemically compatible with the first glass material. Additionally, the second glass material is selected to be thermally compatible with the first glass material to facilitate forming the glass fiber. For example, the second glass material must have approximately the same viscosity versus temperature profile at hot working temperatures as the first glass material.

During the hot forming of the glass fiber, the second glass material, because of the lower CTE, will impart a tensile force upon the first glass material during and after cooling. This results in the second glass material having compressive stresses after formation. Because the strength of the glass fiber is directly related to the presence and growth of inconsistencies on the outer surface, the strength of the glass fiber will be increased by mismatching the CTE's of the first and second glass materials, as discussed above. This is because the compressive stress formed in the second glass material because of the shrinkage will cause the second glass material to resist crack formation and crack propagation.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method for fabricating a transparent composite matrix, comprising:
    providing a first glass fiber preform comprising a first glass material having a first refractive index, a first modulus and a first coefficient of thermal expansion; and coating the first glass fiber preform with a second glass material having a second refractive index, a second modulus and a second coefficient of thermal expansion to form a glass fiber preform having an initial cross-section with a preform total thickness; and
    hot working the glass fiber preform to reduce the initial cross-section to a final cross-section having total thickness, a thickness of the first glass material, and a substantially uniform coating thickness of the second glass material; and
    forming a plurality of the glass fiber into a composite window;
    wherein the second coefficient of thermal expansion is less than the first coefficient of thermal expansion.

2. The method of claim 1, wherein the second coefficient of thermal expansion is between about 0% and about 100% less than the first coefficient of thermal expansion.

3. The method of claim 1, wherein the second coefficient of thermal expansion is between about 70% and about 90% of the first coefficient of thermal expansion.

4. The method of claim 1, wherein the second modulus is between equal to and about 60% less than the first modulus.

5. The method of claim 1, wherein the glass fiber has a cross-section geometry selected from the group comprising a substantially rectangular geometry, a substantially circular geometry, a substantially oval geometry, and a substantially square geometry.

6. The method of claim 5, wherein the cross-section geometry is a substantially rectangular geometry.

7. The method of claim 6, wherein the glass fiber has a total thickness of between about 1 um to about 500 um and an aspect ratio of width to total thickness of between about 5 and about 500.

8. The method of claim 6, wherein the glass fiber has a total thickness of between about 5 um and about 50 um and an aspect ratio of width to total thickness of between about 10 and about 50.

9. The method of claim 1, wherein the hot working is selected from the group comprising extrusion, co-extrusion, hot drawing, spinning, and co-spinning.

* * * * *